United States Patent
Rohaly et al.

(10) Patent No.: US 7,742,635 B2
(45) Date of Patent: Jun. 22, 2010

(54) ARTIFACT MITIGATION IN THREE-DIMENSIONAL IMAGING

(75) Inventors: Janos Rohaly, Acton, MA (US); Douglas P. Hart, Charlestown, MA (US); Tong Zhang, Wellesley, MA (US)

(73) Assignee: 3M Innovative Properties Company, Saint Paul, MN (US)

( * ) Notice: Subject to any disclaimer, the term of this patent is extended or adjusted under 35 U.S.C. 154(b) by 748 days.

(21) Appl. No.: 11/534,570

(22) Filed: Sep. 22, 2006

(65) Prior Publication Data

US 2007/0075997 A1   Apr. 5, 2007

Related U.S. Application Data

(60) Provisional application No. 60/720,238, filed on Sep. 22, 2005, provisional application No. 60/760,902, filed on Jan. 20, 2006, provisional application No. 60/775,643, filed on Feb. 22, 2006.

(51) Int. Cl.
*G06K 9/00* (2006.01)
(52) U.S. Cl. .................... 382/154; 382/106
(58) Field of Classification Search ............ 382/106, 382/154; 348/42, 47–51
See application file for complete search history.

(56) References Cited

U.S. PATENT DOCUMENTS

| | | | | |
|---|---|---|---|---|
| 5,085,502 A | * | 2/1992 | Womack et al. | 356/605 |
| 5,159,361 A | * | 10/1992 | Cambier et al. | 351/212 |
| 7,068,825 B2 | | 6/2006 | Rubbert et al. | |
| 7,305,110 B2 | | 12/2007 | Rubbert et al. | |
| 2003/0004694 A1 | * | 1/2003 | Aliaga et al. | 703/2 |
| 2004/0201587 A1 | * | 10/2004 | Mizusawa | 345/427 |
| 2004/0233290 A1 | * | 11/2004 | Ohashi et al. | 348/187 |
| 2004/0234122 A1 | * | 11/2004 | Kochi et al. | 382/154 |
| 2006/0222209 A1 | * | 10/2006 | Zhang et al. | 382/107 |
| 2006/0241404 A1 | * | 10/2006 | de la Barrera et al. | 600/426 |
| 2007/0167702 A1 | * | 7/2007 | Hasser et al. | 600/407 |
| 2007/0248281 A1 | * | 10/2007 | Super et al. | 382/275 |
| 2009/0022393 A1 | * | 1/2009 | Bar-Zohar et al. | 382/154 |

FOREIGN PATENT DOCUMENTS

WO  WO-2007038330 A1  4/2007
WO  WO-2007038330 A3  4/2007

OTHER PUBLICATIONS

Tsai ("A versatile camera calibration technique for high-accuracy 3D machine vision metrology using off-the-shelf TV cameras and lenses," IEEE J. Robotics and Automation, vol. RA-3, No. 4, Aug. 1987, pp. 323-344).*
"Camera Calibration Toolbox for Matlab", http://www.vision.caltech.edu/bouguetj/calib_doc/.

(Continued)

*Primary Examiner*—Yubin Hung

(57) ABSTRACT

Accuracy of a three-dimensional imaging system is improved through the use of model-based calibration and lookup tables to resolve distance according to, e.g., x-displacement, y-displacement, or image disparity data. In an embodiment, the lookup table(s) stores localized parameterization data used to calculate calibrated results.

2 Claims, 5 Drawing Sheets

OTHER PUBLICATIONS

Brown, Duane C., "Close-range camera calibration", *Photogrammetric Engineering*, (1971).

Brown, Duane C., "Decentering distortion of lenses", *Photogrammetric Eng. 32* (3):, (May 1966),444-462.

Clarke, T A., et al., "The development of camera calibration methods and models", *Photogrammetric Record 16* (91):, (Apr. 1998),51-66.

Devernay, Faugeras F., "Straight lines have to be straight—Automatic calibration and removal of distortion from scenes of structured environments", *Machine Vision and Applications 13* (1):, (Aug. 2001),14-24.

Fraser, C, et al., "Variation of distortion within the photographic field", *Photogrammetric Engineering and Remote Sensing 58* (6):, (1992),851-855.

Fryer, J G., et al., "Distortion for close-range photogrammetry", *Photogrammetric Engineering and Remote Sensing 52*(1):, Geodetic Services Inc., Melbourne, FL, USA); Brown, D.C, (Jan. 1986),51-58.

Gennery, Donald B., "Generalized camera calibration including fisheye lenses", *Journal of Computer Vision 68* (3):, (May 2006),239-266.

Hartley, R I., et al., "Parameter-free radial distortion correction with centre of distortion estimation", *Tenth IEEE International Conference on Computer Vision* vol. 2, Sing Bing Kang,(Oct. 2005)),1834-1841.

Heikkia, J, et al., "A four-step camera calibration procedure with implicit image correction", *IEEE Computer Society Conference on Computer Vision and Pattern Recognition.*, Silven, O.,(Jun. 1997),1106-1112.

Lucchese, L, "Geometric calibration of digital cameras. part I: Camera model, subpixel feature extraction, and algorithm initialization", *Visualization, Imaging, and Image Processing 396*, (2003).

Lucchese, L., et al., "Using saddle points for subpixel feature detection in camera calibration targets", *Asia-Pacific Conference on Circuits and Systems* (APCCAS '02), vol. 2, Mitra, S.K.,(Oct. 2002),191-195.

Magill, Arthur A., "Variation in distortion with magnification", *Journal of the Optical Society of America 45* (3):, (1955),148.

Shortis, M R., et al., "Extended lens model calibration of digital still cameras", *International Archives Photogrammetry and Remote Sensing 32* (5):, Robson, S. and Beyer, H. A., (1998),159-164.

Shortis, M R., et al., "Multiple focus calibration of a still video camera", *International Archives Photogrammetry and Remote Sensing 31* (5):, Robson, S. and Short, T.,(1996),534-539.

Stevenson, D E., et al., "Nonparametric correction of distortion", *Workshop on Applications of Computer Vision, WACV '96.*, Fleck, M.M,(Dec. 1996),214-219.

Sturm, Peter, "Algorithms for plane-based pose estimation", *Proceedings of the IEEE Conference on Computer Vision and Pattern Recognition*, (Jun. 2000)),1010-1017.

"International Search Report", *Notification of Transmittal of the International Search Report and the Written Opinion of the International Searching Authority, or the Declaration*, (Nov. 20, 2007),all pages.

Weng, J, et al., "Camera calibration with distortion models and accuracy evaluation", *IEEE Transactions on Pattern Analysis and Machine Intelligence 14* (10):, (Oct. 1992),965-980.

Zhang, Z, "A flexible new technique for camera calibration", *IEEE Transactions on Pattern Analysis and Machine Intelligence 22* (11):, (Nov. 2000),1330-1334.

Zhang, Z, "Flexible camera calibration by viewing a plane from unknown orientations", *Conference on Computer Vision* (ICCV'99),, (Sep. 1999),666-673.

* cited by examiner

ARTIFACT MITIGATION IN THREE-DIMENSIONAL IMAGING

RELATED APPLICATIONS

This application claims the benefit of the following commonly-owned U.S. Provisional Patent Applications, each of which is incorporated by reference herein in its entirety: U.S. App. No. 60/720,238 filed on Sep. 22, 2005; U.S. App. No. 60/760,902 filed on Jan. 20, 2006; and U.S. App. No. 60/775,643 filed on Feb. 22, 2006.

BACKGROUND

1. Field of the Invention

The invention relates to three-dimensional scanning, and more particularly to techniques for addressing artifacts in derivations of three-dimensional data.

2. Description of the Related Art

Acquisition of data for three-dimensional imaging generally includes artifacts related to, for example, the imaging subject, ambient conditions, and inherent properties of the optical and electronic systems used for data acquisition.

General calibration techniques may employ direct measurement of known targets to characterize these errors, as well as mathematical modeling of non-ideal aspects of an imaging system. As a significant disadvantage, modeling techniques can present difficult characterization challenges and may fail to capture actual sources of imaging artifacts. Conversely, brute force calibration may be time consuming, and typically requires a specialized, sensitive hardware platform. Brute calibration also results in very large calibration files, particularly for the multi-dimensional data sets used in three-dimensional imaging. The selection among these existing alternatives will generally depend on the characteristics of the system being calibrated, and usually forces some degree of compromise on a designer. In multi-aperture devices and other systems having more than one optical channel, the selection of an appropriate calibration regime may become more difficult because each channel may present different characteristics affecting calibration.

There remains a need for improved calibration techniques suitable for use with optical devices having more than one optical channel, such as multi-aperture imaging systems.

SUMMARY

Performance of a three-dimensional imaging system, and calibration thereof, is improved through the use of model-based calibration and lookup tables to resolve depth according to, e.g., x-displacement, y-displacement, and/or image disparity data. In an embodiment, the lookup table(s) stores localized parameterization data used to calculate calibrated results.

BRIEF DESCRIPTION OF THE FIGURES

The invention and the following detailed description of certain embodiments thereof may be understood by reference to the following figures.

DETAILED DESCRIPTION

Described below is a technique for calibrating a three-dimensional imaging system. While the lookup tables and calibration techniques are described in reference to certain multi-aperture systems that use disparity information to recover depth, it will be understood that variations and alternative embodiments would be apparent to one of ordinary skill in the art and are intended to fall within the scope of this disclosure. For example, a system may employ time, differences in spatial frequency content, or any other criterion suitable for organizing and retrieving parameters used in encoding depth and calibration calculations.

In the following description, the term "image" generally refers to a set of two-dimensional pixels forming a two-dimensional view of a subject within an image plane. The term "image set" generally refers to a set of related two dimensional images that might be resolved into three-dimensional data. Typically, although not necessarily, this would include two or more images of a subject captured substantially simultaneously using different cameras or apertures, or two or more images of a subject captured from the same aperture at different times. The term "point cloud" generally refers to a set of three-dimensional points forming a three-dimensional view of the subject reconstructed from a number of two-dimensional views. In a three-dimensional image capture system, a number of such point clouds may also be registered and combined into an aggregate point cloud constructed from images captured by a moving camera (or a moving subject). Thus it will be understood that pixels generally refer to two-dimensional data and points generally refer to three-dimensional data, unless another meaning is specifically indicated or clear from the context.

Figure 1:
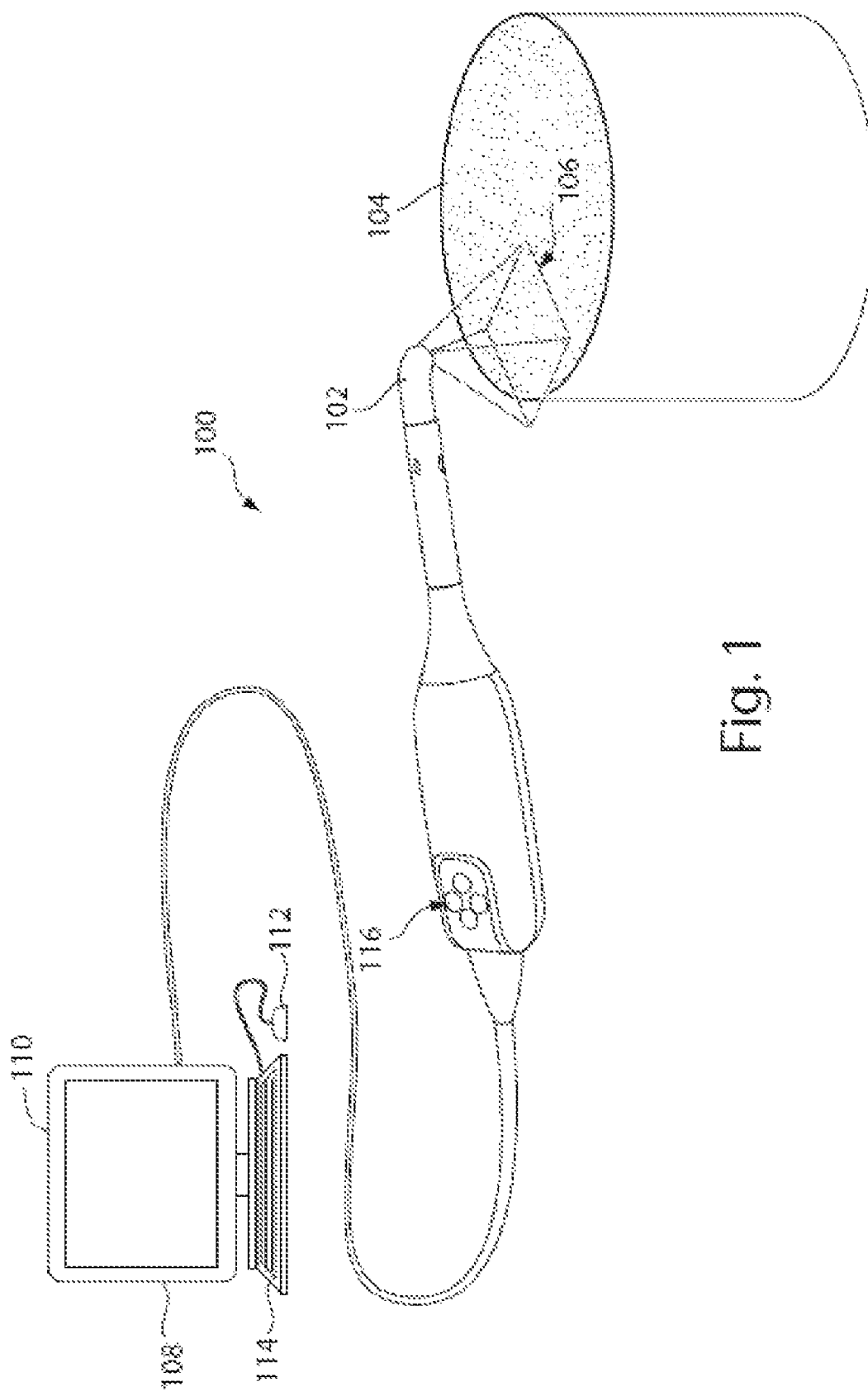
FIG. 1 shows a three-dimensional imaging system.

FIG. 1 shows an image capture system. In general, the system 100 may include a scanner 102 that captures images of a subject 104 within a field of view 106, and forwards the images to a computer 108, which may include a display 110 and one or more user input devices such as a mouse 112 or a keyboard 114.

The scanner 102 may include any camera or camera system suitable for capturing images from which a three-dimensional point cloud may be recovered. For example, the camera 102 may employ a multi-aperture system as disclosed, for example, in U.S. Pat. Pub. No. 20040155975 to Hart et al., the entire contents of which is incorporated herein by reference. While Hart discloses one multi-aperture system, it will be appreciated that any multi-aperture, multi-pupil, multi-camera, or other multi-channel optical system suitable for reconstructing a three-dimensional point cloud from a number of two-dimensional images may similarly be employed. In one multi-aperture embodiment, the scanner 102 may include a plurality of apertures including a center aperture positioned along a center optical axis of a lens and any associated imaging hardware. The scanner 102 may also, or instead, include a stereoscopic, triscopic or other multi-camera or other configuration in which a number of cameras or optical paths are maintained in fixed relation to one another to obtain two-dimensional images of an object from a number of slightly different perspectives. The scanner 102 may include suitable processing for deriving a three-dimensional point cloud from an image set or a number of image sets, or each two-dimensional image set may be transmitted to an external processor such as contained in the computer 108 described below. In other embodiments, the scanner 102 may employ structured light, laser scanning, direct ranging, or any other technology suitable for acquiring three-dimensional data, or two-dimensional data that can be resolved into three-dimensional data.

In one embodiment, the scanner 102 is a handheld, freely positionable probe having at least one user input device, such as a button, lever, dial, thumb wheel, switch, or the like, for user control of the image capture system 100 such as starting and stopping scans.

Although not shown in FIG. 1, it will be appreciated that a number of supplemental lighting systems may be usefully employed during image capture. For example, environmental illumination may be enhanced with one or more spotlights, ring lights, or coaxial illumination sources illuminating the subject 104 to speed image acquisition and improve depth of field (or spatial resolution depth). The scanner 102 may also, or instead, include a strobe, flash, or other light source to supplement illumination of the subject 104 during image acquisition, or to provide illumination in different spectral bands.

The subject 104 may be any object, collection of objects, portion of an object, or other subject matter. While illustrated in FIG. 1 as a simple geometric form, the subject 104 may include much more complex surfaces, and any number of separate elements. For example, in a dental imaging application, the subject 104 may include a tooth, a quadrant of teeth, or a full collection of teeth including two opposing arches from which a virtual dental impression is desired. The subject 104 may also, or instead, include a dental prosthesis such as an inlay, a crown, or any other dental prosthesis, implant, or the like. The subject 104 may include a dental model, such as a plaster cast, wax-up, impression, or negative impression of a tooth, teeth, soft tissue, or some combination of these. In certain instances, an optical or textured imaging agent may be applied to surfaces of the subject 104 to improve capture of three dimensional points. In other embodiments, the subject 104 may be a human head, or a portion thereof, from which a three-dimensional model is desired for custom fitting of a hearing aid, eyeglasses, goggles, or the like. In other embodiments, the subject 104 may be a physical model of an object for use in digital animation, such as a miniature, physical model for use in a three-dimensional digital animation process. From the preceding examples, it will be apparent that a system using the techniques described herein may be suitably adapted to a wide range of applications for relatively short range, high resolution, three-dimensional image acquisition. However, one skilled in the art will appreciate that suitable adaptations to the image capture system 100 may be made for a variety of other three-dimensional imaging applications based upon multi-aperture or multi-camera systems, as well as other three-dimensional imaging systems and technologies, and all such variations are intended to fall within the scope of this disclosure.

The field of view 106 may include a two-dimensional field of view of the camera 102. It will be appreciated that the term "field of view" as used in this paragraph, refers to a plane in the imaging environment rather than a plane within an optical sensor (such as film or sensors) where an image is captured. Though illustrated as a rectangle the field of view 106 may, for example, form a square, a circle, or any other geometry provided by the scanner 102. In general, the scanner 102 will have a depth of field or range of depth resolution that, together with the field of view 106, specifies a measurement volume of the scanner 102. The depth of field may vary with environmental conditions such as ambient light.

The computer 108 may be, for example, a personal computer or other processing device. In one embodiment, the computer 108 includes a personal computer with a dual 2.8 GHz Opteron central processing unit, 2 gigabytes of random access memory, a TYAN Thunder K8WE motherboard, and a 250 gigabyte, 10,000 rpm hard drive. This system may be operated to capture approximately 1,500 points per image set in real time using the techniques described herein, and store an aggregated point cloud of over one million points. Other embodiments using commercially available, more performant hardware may capture approximately 3,000 points per image set in real time. The number of points per image in a particular embodiment may depend on a number of factors including density and configuration of sensors and other imaging hardware. More generally, processing capabilities of the computer 108 may vary according to the size of the subject 104, the speed of image acquisition, and the desired spatial resolution of three-dimensional points. The computer 108 may also include peripheral devices such as a keyboard 114, display 110, and mouse 112 for user interaction with the camera system 100. The display 110 may be a touch screen display capable of receiving user input through direct, physical interaction with the display 110.

Communications between the computer 108 and the scanner 102 may use any suitable communications link including, for example, a wired connection or a wireless connection based upon, for example, IEEE 802.11 (also known as wireless Ethernet), BlueTooth, or any other suitable wireless standard using, e.g., a radio frequency, infrared, or other wireless communication medium. In medical imaging or other sensitive applications, wireless image transmission from the scanner 102 to the computer 108 may be secured. The computer 108 may generate control signals to the scanner 102 which, in addition to image acquisition commands, may include conventional camera controls such as focus or zoom.

In an example of general operation of a three-dimensional image capture system 100, the scanner 102 may acquire two-dimensional image sets while the scanner 102 is passed over a surface of the subject. The two-dimensional image sets may be forwarded to the computer 108 for derivation of three-dimensional point clouds. The three-dimensional data for each newly acquired two-dimensional image set may be derived and fitted to existing three-dimensional data using a number of different techniques. One useful example of such a technique is described in commonly-owned U.S. application Ser. No. 11/270,135, filed on Nov. 9, 2005, the entire contents of which is incorporated herein by reference. However, it will be appreciated that this example is not limiting, and that the principles described herein may be applied to a wide range of three-dimensional image capture systems.

Figure 2:
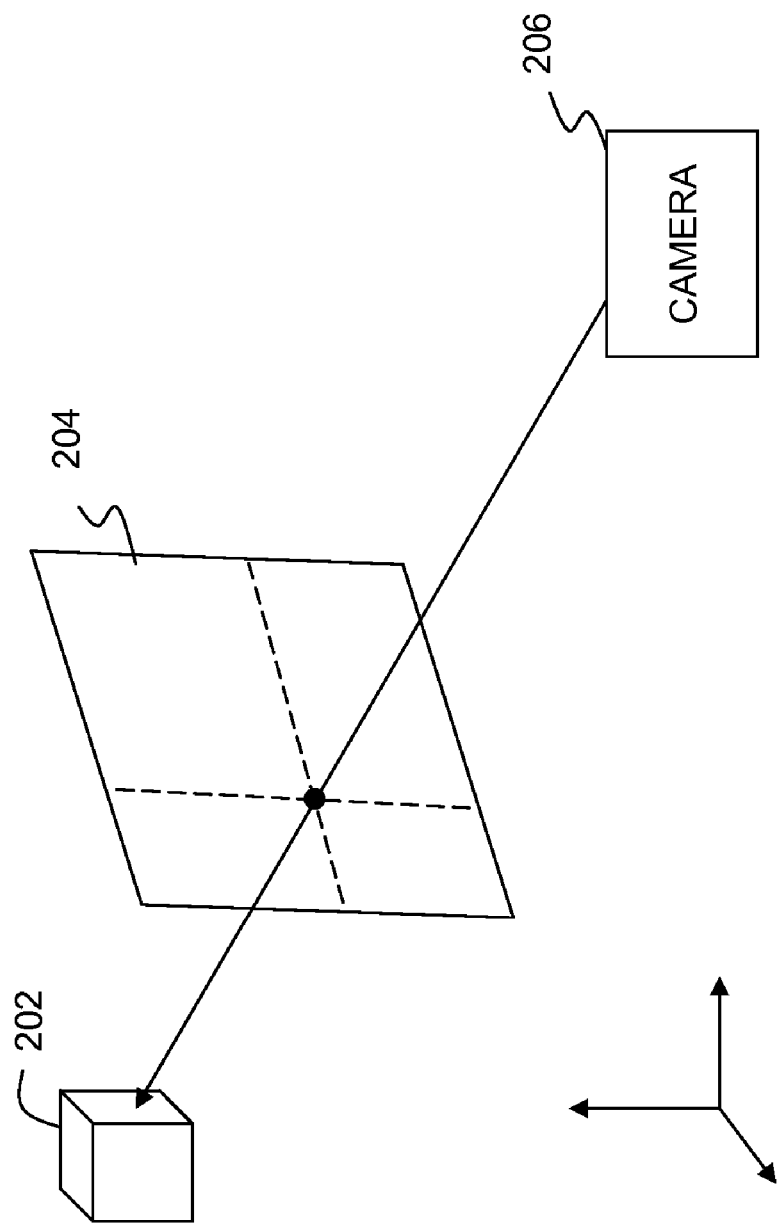
FIG. 2 illustrates coordinate systems for a three-dimensional imaging system.

FIG. 2 illustrates the coordinate systems for a multiaperture imaging system, such as the system described above. It will be understood that, as used herein, the term multiaperture is intended to refer to a single camera having two or more apertures (or pupils or the like), or two or more single-aperture cameras such as employed in stereoscopic imaging, or some combination of these. In general an object 202 within a field of view 204 of a camera 206 has world coordinates $\{X_w, Y_w, Z_w\}$, camera coordinates $\{X_c, Y_c, Z_c\}$, and image set coordinates $\{x_i, y_i, \underline{d}_i(x_i, y_i)\}$ for i=1 to N points or pixels within a processing mesh of the field of view 204, where $\underline{d}_i$ is a disparity vector containing one or more disparity values that characterize displacement of a point in the field of view 204 for a number of apertures. The disparity vector may be expressed, for example, in terms of displacement relative to a center channel, if any, for the camera 206. In general, the disparity vector encodes depth, and in other three-dimensional imaging systems, this disparity vector may be replaced by one or more other measured quantities that encode depth. Thus terms such as disparity vector, disparity value, and disparity data should be understood broadly to include any one or more scalar and/or vector quantities measured by a system to encode depth information.

In a conventional calibration, the world coordinates may be related to uncalibrated image set coordinates through a rotation and/or translation that can be characterized using a battery of calibration measurements with a hardware fixture. A target such as a planar target having a pattern may be moved through a variety of known positions and/or rotations relative to the camera 206 using a calibration bed (or similar hardware) while capturing image set coordinates. A number of models may be employed to correlate image set coordinate data to the camera coordinate(s). Similarly, if the positions of calibration targets are known and the target has one or more identifiable features, then points in the measurement volume can be directly correlated to $X_w$, $Y_w$, and $Z_w$ values in world coordinates. A general goal of such calibration is to permit operational determination of a true distance from the camera 206 to a point on the subject 202, or to determine the world or camera coordinates of a point on the subject.

Figure 3:
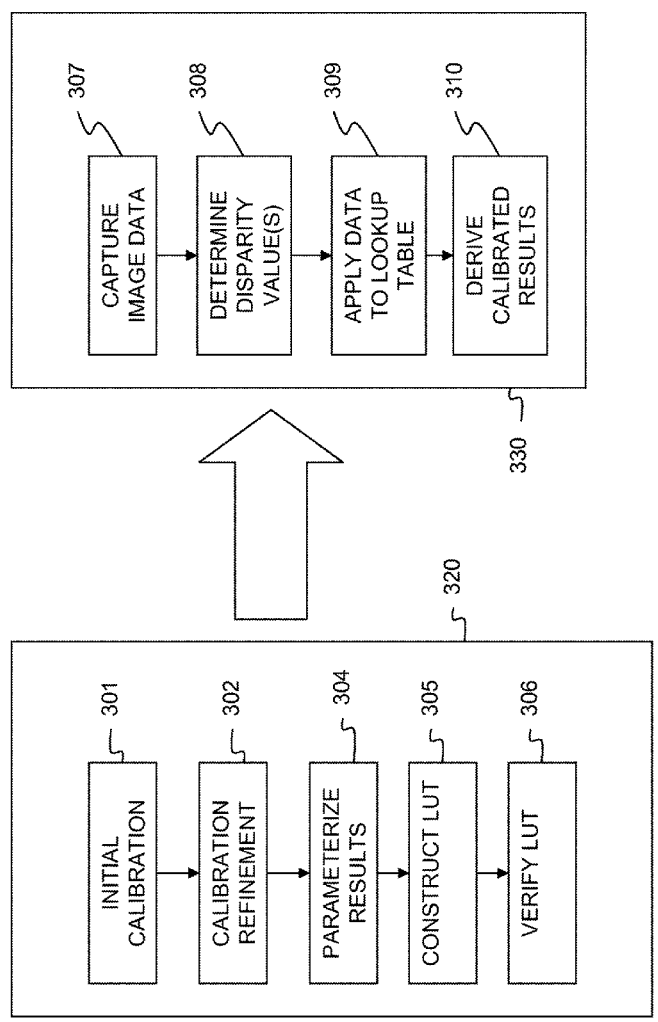
FIG. 3 shows a process for lookup table construction and use.

FIG. 3 shows a process for lookup table construction and use. In brief overview, image data is acquired in an initial calibration from a known target in a number of calibration cycles, as shown in step 301. The calibration may be refined in subsequent processing steps 302, and results may be parameterized using image results (e.g., data from a scanner, and/or disparity data derived therefrom or other data encoding depth information) in combination with true position data (e.g., known target location and/or orientation, or known distance of a point from the camera) available from a calibration system, as shown in step 304. The true position data from the calibration system may include position data delivered from a calibration fixture, or obtained through processing of targets during one or more calibration cycles, or some combination of these. The parameterized results may be used to construct a lookup table, as shown in step 305. Finally, the lookup table may be employed to derive three-dimensional data from two-dimensional images captured by the image capture system, as shown in step 309. In general, the objective of this process is to obtain true results for three-dimensional data, which may be advantageously realized, for example, as a system for obtaining real time, calibrated three-dimensional results through the use of a lookup table.

The initial acquisition of calibration data of step 301 is now described in greater detail. Acquisition of data from a known target may be performed using a controlled calibration bed that moves the target a predetermined distance towards the instrument for each calibration cycle. For example, the calibration bed may move the target 25 microns closer to the instrument for each calibration cycle. At each distance, image set coordinates may be obtained. The camera 206 may include a center aperture, in which case calibration measurements may be used to capture extrinsic camera parameters, i.e., rotation and translation from world coordinates to camera coordinates for the collected set of points. More generally, multiaperture data may be expressed as x and y coordinates in the coordinate system of each sensor, along with disparity vectors that characterize displacement of a point for different apertures from the relevant point in a reference frame (e.g., the center aperture). The calibration may be performed on the reference frame, e.g., from the center channel or center aperture, with the resulting lookup table used to convert disparity data into X, Y, Z coordinates.

A variety of useful targets may be employed. For example, a checkerboard or other target may be used. Generally, a target with a distinct center feature or other fiducial is desirable for calibrating an imaging system. Random patterns may also be employed to characterize image disparity fields. A hybrid target may also be employed including a number of fiducials, e.g., nine points equally distributed on a rectangular grid, along with a random pattern between the fiducials. This permits construction of a lookup table that accounts for processing artifacts of an image processing algorithm (such as an area-based, rather than point-based algorithm) along with other camera calibration. Such a target may, for example, permit correlation between center and side images as well as correlation between side images. For example, a known arrangement of fiducials may be used to recover target position in the camera coordinate system (such as from the center channel image), and a random pattern may be used to recover plane points using side channel images. The recovered plane points may be orthogonally fitted with a plane, with orthogonal distance from the fitted plane providing a measurement of noise in the imaging system (e.g., due to noise in disparity estimation, lookup tables, and so forth). While verification of a lookup table is discussed in greater detail below, it is noted in this context that a difference between the plane identified using fiducials and the plane identified by applying the lookup table system to random elements of the hybrid target may serve as a validation or verification of a particular lookup table created according to the systems and methods described herein.

The use of multiple random patterns within fiducials may also advantageously permit computation of ensemble averaged disparities to reduce rms noise in the calibration process. In one embodiment, target patterns such as random noise and/or fiducials may be projected onto a target, for example back projected by a digital data projector on a holographic diffuser, to permit use of different patterns within a calibration cycle or across a number of calibration cycles.

In one aspect, a first calibration may be performed using arbitrary planar or three-dimensional calibration target locations and orientations. This first step, which may be performed using standard calibration techniques, may be employed to calibrate without recovery of depth-dependent terms.

This calibration may be refined, as shown in step 302. A second calibration may use a sequence of planar calibration targets having arbitrary, unknown orientation and a known step increment (e.g., 200 microns) in an arbitrary, unknown direction. By using an assumption of parallel target motion (and corresponding calibration hardware that provides substantially parallel target movement), the second calibration step may be employed to recover a two-dimensional geometric distortion model including depth-dependent terms. In addition, this process may be employed to recover target orientation and motion, which may advantageously loosen restrictions on the corresponding calibration hardware. This calibration technique may be usefully employed in any optical system having at least one well-characterized optical channel (e.g., the center channel described above), that is, a channel conforming to one or more known distortion models suitable to parameterization.

Typically, the calibration cycles for creation of a lookup table would sample an entire measurement volume using a Z increment at or near the desired resolution of a system. However, where there is a closely constrained relationship between disparity and depth that is governed for example by a known geometric defocus-based formula, a dense lookup table with equidistant disparity values can be built after fitting disparity and depth points with the known function. Thus, in one aspect there is disclosed a technique for deriving a dense lookup table for obtaining calibrated distance measurements using known geometric defocus for an imaging device. Given a closely constrained relationship between disparity and depth that is governed by a given geometrical defocus based formula, a dense lookup table can be constructed analytically with equidistant disparity values after satisfactorily fitting disparity and depth points using the techniques described above. Stated inversely, it is possible to sample a disparity/ depth space of a lookup-table-based system at a lower resolution, and analytical construct a full resolution lookup table.

The calibration may be refined, for example, by enforcing a parallel target constraint with a Z dependent distortion model. The result of such a calibration refinement may include a set of points in the camera coordinate system along with relevant disparity data. In one aspect of refinement, the Z dependent distortion parameters may be determined. In another aspect of refinement, other model parameters useful for obtaining calibrated output may be derived such as camera focal length, image plane or processing mesh x-dependent terms, image plane or processing mesh y-dependent terms, and so forth. The disparities may also be interpolated onto a fixed processing mesh for the well characterized channel (e.g., center channel of a multiaperture system) to reduce processing time ordinarily associated with a full calibration.

As a general matter, it will be understood that Z-dependent distortion in acquired images can be introduced by various lenses and/or off-axis ray paths through an optical system. While the distortion of an optical system is typically dominated by radial and de-center distortions, which suffice for most camera calibration purposes, the depth-dependent distortion may be important for accurate camera calibration. In one aspect, certain dominant terms such as radial distortion may be addressed by a first calibration, and one or more depth-dependent terms can be added in subsequent calibration refinements.

As shown in step 304, results from the calibration cycles may be parameterized for easier and more flexible use of the lookup table. A number of parameterization models may be usefully employed. While the examples below generally employ a disparity vector as a lookup table input, it will be appreciated that a z value may be calculated from the acquired data, and the x, y, and (calculated) z values from the acquired image may alternatively be used as indices for a lookup table, with suitable adaptations to subsequent processing.

To parameterize calibration results, data from each calibration target location/orientation may be characterized as an array, or number of arrays containing disparity values for each x and y location in a processing mesh for a field of view of the camera. A scalar characterization of the disparity, such as an x-axis disparity (relative to the field of view), $d_x$, a y-axis disparity (relative to the field of view), $d_y$, or $|d|$, the magnitude of the disparity vector, may be stored as a data point along with one or more true camera coordinates for the acquired data. Stored in this manner, the lookup table may be deployed as a direct lookup of camera coordinates $\{X_c, Y_c, Z_c\}$, as described in more detail below.

In another embodiment, true values, such as the Z value, may be correlated to a disparity parameter (such as one of the scalar disparity quantities noted above) using, for example, curve fitting techniques to mathematically model the relationship between these variables. In one useful example corresponding to empirical local data for a y-axis disparity, Z is related to $d_y$ ($d_y$, ($d_x$, or $|d|$ could also be suitably employed) such that $$Z(x, y) \propto \frac{1}{d_y(x, y)} \qquad [\text{Eq. 1}]$$

And data may be fitted to a general relationship:

$$Z(x, y, d_y) = \frac{p_1(x, y)}{p_2(x, y) + d_y(x, y)} + p_3(x, y) \qquad [\text{Eq. 2}]$$

A parameter vector for $d_y$ (at a given (x,y) in the image plane) may be expressed as:

$$p(x,y) = [p_1(x,y) p_2(x,y) p_3(x,y)]^T \qquad [\text{Eq.3}]$$

and a Z value may be determined from the relationship:

$$Z(d_y(x, y), p(x, y)) = \frac{p_1(x, y)}{p_2(x, y) + d_y(x, y)} + p_3(x, y) \qquad [\text{Eq. 4}]$$

In this example, the parameter vector of Eq. 3, p, may be stored in a lookup table indexed according to x, y, and $d_y$ so that uncalibrated image results can be applied to obtain the parameters for Eq. 4, which may in turn be employed to calculate a value for Z. In this context, it will be understood that Z refers generally to a depth variable, which may in a particular implementation correspond to a world coordinate, a camera coordinate, a camera depth, or any other suitable quantity reflecting depth data. It should also be understood that the selection of a y-coordinate disparity is illustrative only, and in no way limits the scope of this disclosure. At the same time, certain physical camera systems may exhibit predominately y-dependent disparity vectors, such as where apertures are oriented collinearly along the y-dimension of the processing mesh. More generally, physical attributes of a camera system (e.g. pupil aberration) may imply consistent distortion, such as Z-dependent radial or tangential distortion measured from the optical center corresponding to a center aperture of a multiaperture camera. A parameterized model may account for such known, regular distortion patterns, by fitting calibration data acquisition results to one or more corresponding models, thus providing a more compact lookup table, fewer calibration measurements, or both. In another aspect, a first gross calibration may address Z-independent radial or tangential distortion, with additional terms added to parameterization in a subsequent fine calibration step.

In another embodiment, the parameter surface itself may be modeled. Where the parameter surface yields to a relatively simple model, which is the case where a camera system produces consistent x, y, and/or z distortions around identifiable points or regions, then a parameterized parameter model may substantially reduce the size of a lookup table calibration system in terms of physical memory or storage. In this context, it is noted that empirically a z-dependent distortion component for an embodiment of the image capture system 100 described above contains dominant terms of the form:

$$\delta_z(Z) \cong \kappa_1 + \frac{\kappa_2}{Z} + \kappa_3 \cdot Z \qquad [\text{Eq. 5}]$$

As shown in step 305, a lookup table, or more generally, a lookup table system, may be created for the above calibration data and models by fitting calibration test results to one or more models to obtain model parameters as described above using any suitable fitting, error minimization, or other techniques. The construction of the lookup table will depend upon specific implementations, some of which are discussed in greater detail below. As a general proposition, the lookup table implementation for an image capture system will provide a mechanism for relating newly acquired data from the image capture system to coordinate data for surface points on an imaging subject. As a significant advantage, calibrating an image system in this manner permits localization of a camera model that is used to relate disparity values to object space data, or stated differently, the creation of an array of local models that follow a more generic, parameterized model.

As shown in step 306, the lookup table or lookup table system may be verified and/or enhanced using a number of techniques.

In one general approach, the lookup-table-based model can be verified by exposing the calibrated system to various control conditions or objects and measuring the accuracy of resulting output. A hybrid target, such as described above, may be placed in a known position, and results from a corresponding image from the calibrated system may be compared to expected results for the target. The results of this comparison may also, or instead, be fed back to refine the lookup table(s). In another aspect, noise in point cloud output from the lookup table based system to identify noise in the overall system and/or lookup table.

While planar targets having various patterns provide one useful medium for calibration systems, it will be understood that targets having different geometries may also, or instead be employed (both in lookup table construction and verification). For example, dimensionality may be provided to the target by using a sphere, cone, or other shape, and a (known) dimensional characteristic of the target can be measured using the calibrated system. So, in an example verification process, one or more images of a sphere may be acquired, and a radius of the sphere may be calculated using acquired data and compared to the known value. The results of this comparison may also, or instead, be fed back to refine the lookup table(s).

A shape such as a sphere may be employed in other ways to verify or validate a lookup-table-based calibration. For example, with an object such as a sphere or other shape, and/or portion thereof within the measurement volume of an imaging system, contour detection using known techniques may be applied to locate an outside edge of the object, i.e., a projection of the object onto the image plane. Using the example of a sphere, a circle may be detected, and also analytically determined based on sphere location and camera location, along with Z-dependent or Z-independent camera models such as those described above. The measured sphere location may be calculated by iteratively optimizing for parameters of the sphere for which the analytical and measured contours converge (e.g., error or deviation is minimized). Thus in one aspect, there is disclosed herein a calibration validation method in which a first contour of a three dimensional object is acquired from a two-dimensional image, a second contour of the three dimensional object is analytically determined for a projection of the three dimensional object in an image plane of the two-dimensional image, and the first contour and the second contour are iteratively compared across two or more variations to a parameter of the three-dimensional object. The iterative comparison may be evaluated for deviations between the first contour and the second contour, and more particularly, to minimize deviation between the contours. In one embodiment, the three dimensional object is a sphere and the parameter is a radius of the sphere. In another embodiment, the parameter is a location of the sphere. Two or more parameters may be varied. Analytically determining the second contour may include applying one or more camera models for an imaging system. Similar techniques may be applied, for example, to a cone, a pyramid, a pyramid with steps, and so forth. Further, while the description above relates generally (although not exclusively) to modeling of a center channel, the model-based validation techniques described herein may be suitable applied to any channel such as one or more side channels of a multi-aperture system, provided the channel is sufficiently well modeled to permit analytical determination of expected results.

As shown generally in a process 330, the lookup table or lookup table system may be applied to new image data such as an image set from the image capture system 100 to achieve high-speed calibration of acquired images. Once constructed, use of a lookup table may be straightforward, involving either direct access to results from the lookup table, or relatively simple calculations using parameters obtained from the lookup table, along with any linear or other interpolation suitable or desired, or combinations of these.

More specifically, use of a lookup table may begin with a capture of data from an image acquisition system, as shown in step 307. Using various techniques known in the art, disparity data may be obtained for one or more channels of a multi-channel (or multi-camera) imaging system, as shown in step 308. The disparity data usually contains a processing mesh location and one or more disparity quantities at that location, although other techniques for encoding depth information are known, and may be usefully employed with the systems and methods described herein.

As shown in steps 309 and 310, data from an imaging system may be applied to a lookup table system to derive calibrated results. A lookup table system may be adapted to a number of deployments using, for example, indices, vectors, parameters, and/or parameterized parameters according to, for example, any design preferences concerning implementation and/or any processing or memory improvements that might be achieved from the characteristics of a particular calibration implementation. In general, operation of the lookup table proceeds as:

$$(i,j,k) \to LUT \to \{X_c, Y_c, Z_c\}\{X_c, Y_c, Z_c\}$$

It will be understood that, while in general the indices i and j may corresponding to processing mesh coordinates and k may correspond to disparity data (which may be a scalar or vector quantity), other arrangements of indices are possible, including indices calculated from any of the foregoing. It will further be appreciated that any number of variations to a lookup-based scheme may be employed, including, for example, intermediate lookup tables to recover parameters, which may, in turn, be used to calculate final results, or to calculate indices for additional lookup tables. In addition, it will be appreciated that linear or other interpolation may be employed within a lookup-based system. For example, linear interpolation may be applied to interpolate final values from adjacent lookup table results. In another example, where suitable for a particular model, interpolation may be applied to intermediate results such as indices or parameters. Interpolation may also take into account a specific spreading of the data in the $\{X_c, Y_c, Z_c\}$ coordinate system due to perspective projection or the like. For example, if a point falls in between lookup table points, distance weighted interpolation may lead to errors which can be addressed by finding (through interpolation) a projection ray that intersects the specific (x, y) image location, and determining the $\{X_c, Y_c, Z_c\}$ point on that ray by other interpolation.

The above techniques contemplate numerous variations, such as use of different calibration targets and hardware, use of different distortion or camera models, and varying degrees of empirical and/or theoretical modeling. In addition, numerous variations to the process depicted in FIG. 3 are possible. For example, the steps of acquiring calibration data and parameterizing results may be performed multiple times, such as once for each target location, and may, where processing-intensive, be performed across multiple processors or processing threads. Further, the results of each calibration cycle may be employed to populate a lookup table before proceeding with a next calibration cycle. In one embodiment, a calibration refinement step may use additional constraints to improve calibration using, for example, a set of coplanar and equidistant targets. Thus, the conceptually high level process flow depicted in FIG. 3 should not be understood as limiting the scope of the methods and systems disclosed herein, or restricting the numerous variations and modifications that would be understood to one of ordinary skill in the art. All such variations and modifications are intended to fall within the scope of this disclosure.

Figure 4:
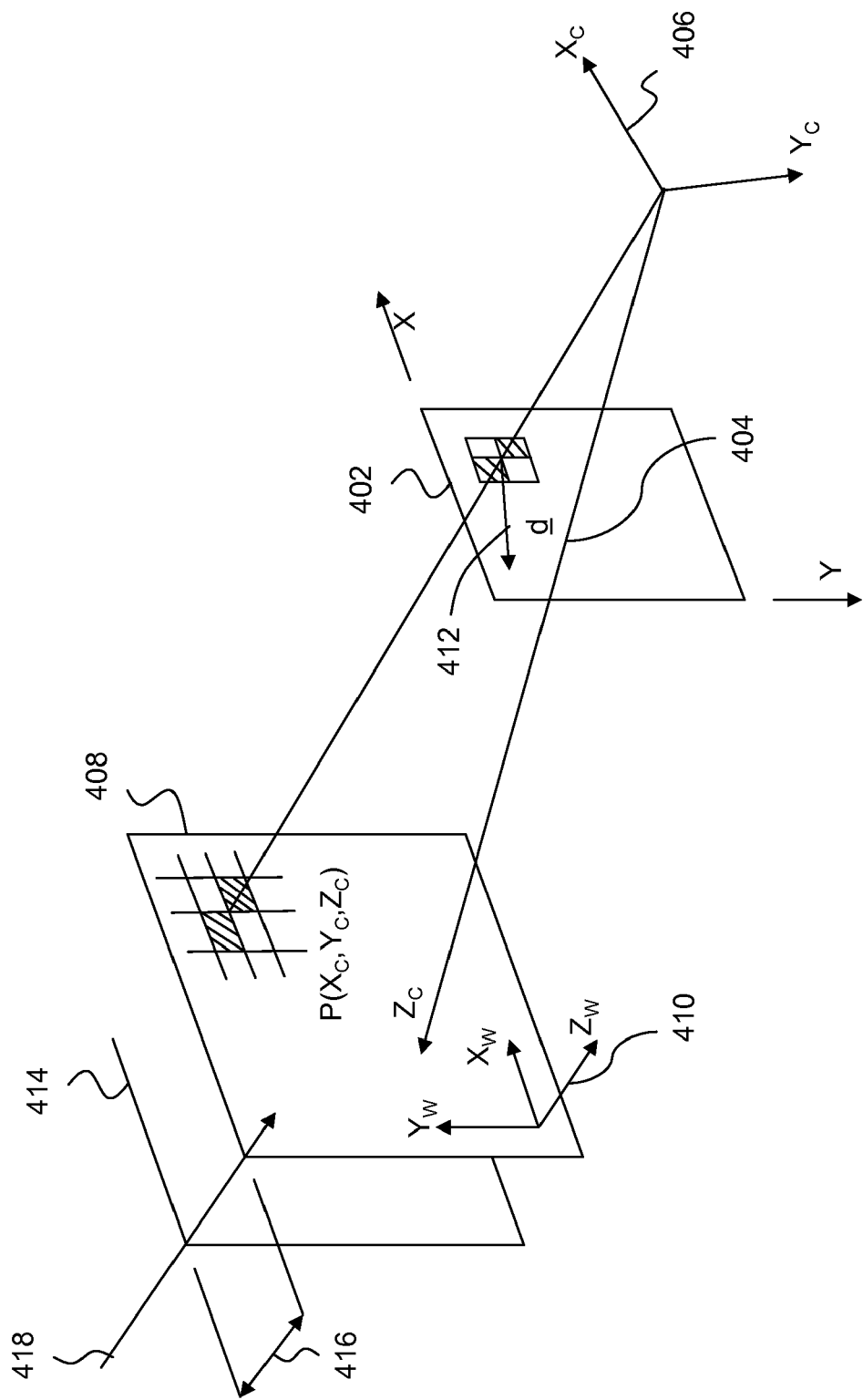
FIG. 4 illustrates aspects of a calibration process.
Figure 5:
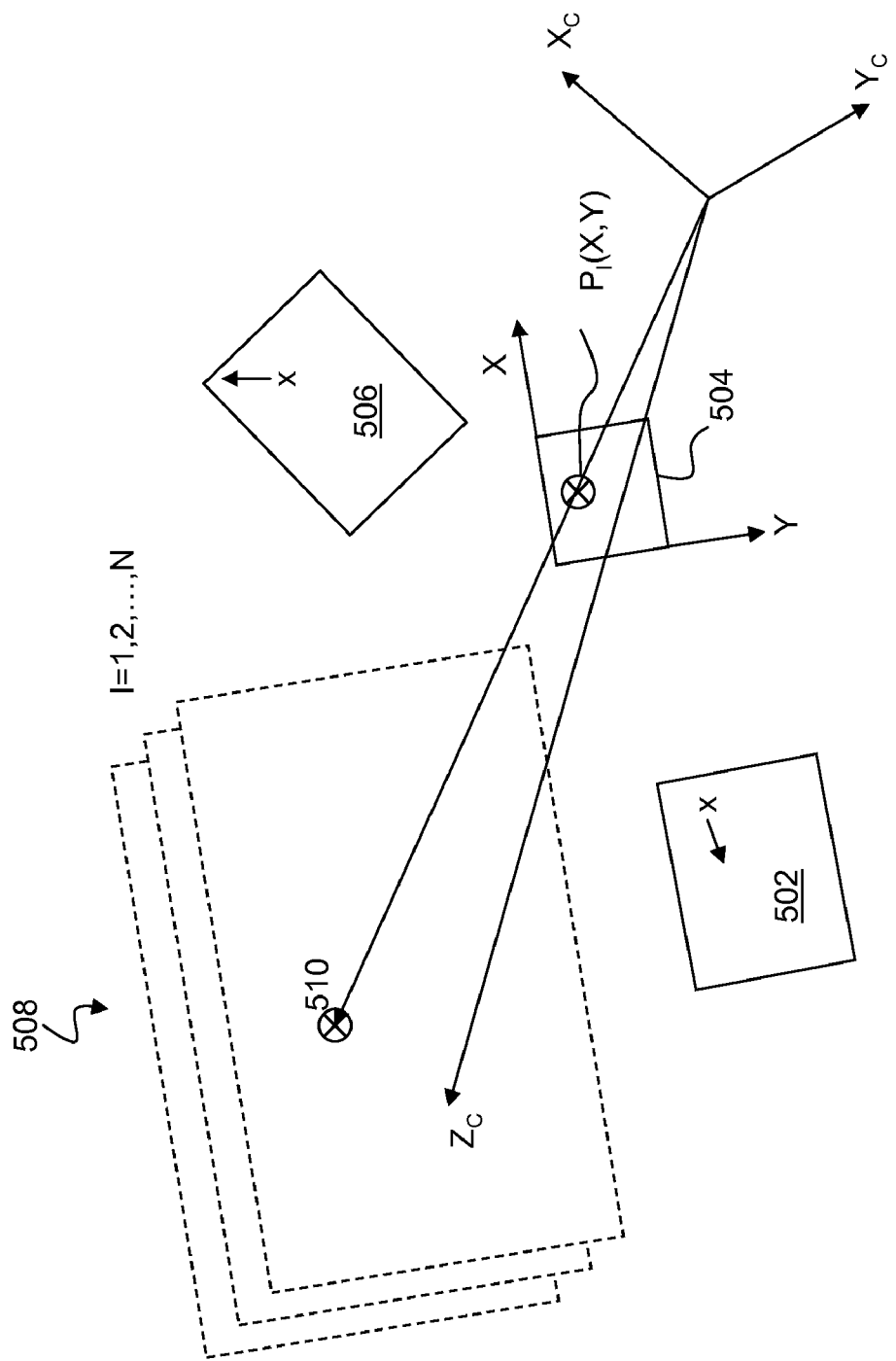
FIG. 5 illustrates aspects of a calibration process.

By way of example and not of limitation, FIGS. 4 and 5 illustrate various aspects of a calibration system and process using the techniques described above.

FIG. 4 illustrates aspects of a calibration process. As depicted, a center channel image plane 402 having a principal point 404 corresponding to a Z axis of the camera coordinate system 406, may contain an image of a calibration target 408 having a point with a location in the camera coordinate system 406 and a world coordinate system 410. A disparity value 412 such as a disparity vector may characterize a displacement of the point from the center channel image plane 402 and another image plane (not shown), such as a side channel image plane. The disparity value 412 may include, for example, an x-displacement and a y-displacement for the point between respective channels, or any other value(s) that can encode distance data and be used with the calibration techniques described herein. In order to improve detection and the resulting calibration, the point may be an x-junction formed of adjacent black and white squares. However, it will be understood that other image types may be used as points within a calibration process. The general technique disclosed in FIG. 4 may be employed for an initial standard reference calibration of a center channel using a Z-independent distortion model as described herein.

In one aspect, there is disclosed herein an improvement to calibration using x-junctions. While checkerboards (including x-junctions) are a commonly used calibration target due to the highly local nature of an x-junction, use of such x-junctions can produce large errors for out of focus points, and can be highly susceptible to unwanted local artifacts such as dirt, scratches, or other physical contamination of lenses. With respect to out-of-focus points, accuracy depends on the amount of blur in captured images, and the ability to capture data throughout a measurement volume depends heavily on the depth of field for a particular image capture.

In such circumstances, calibration may be improved using global constraints, such as collinearity of a number of x-junctions on a calibration target, in combination with homography constraints between the calibration target and undistorted points in an image plane. In order to apply such constraints, x-junction images (or more generally, a target image) must be undistorted, such as by applying a radial distortion model, a tangential distortion model, or any other known model for the system. The global constraint(s) may then be applied, such as by warping an image to conform x-junction locations to a known collinearity. A general orthogonal line fitting approach may be employed to avoid singularity, and the intersection of undistorted lines connecting the undistorted points can be obtained and used together with any computed distortion parameters to refine the distorted x-junction locations for subsequent calibration purposes. By enforcing an exact (or substantially exact) homography relationship between the target points and the distorted x-junction locations, the disparity vectors for a distortion field that relates distorted points to undistorted points. This distortion field may permit subsequent operations directly on a distorted image from an imaging system.

The resulting calibration may advantageously reduce bias otherwise resulting from alternating black and white image features, and reduce the influence on calibration of optical artifacts such as dirt and scratches on lenses or other surfaces.

A lookup table sweep, as referred to above, may include moving the calibration target 408 through one or more parallel planes 414 and acquiring data to refine center channel camera parameters such as Z-dependent distortion. This calibration refinement step may yield a quasi ground truth set of camera coordinate data points for the lookup table generation described above. In embodiments, the calibration sweep may advantageously be performed using movements of the calibration target 408 having a known spacing 416 and an unknown direction 418.

FIG. 5 illustrates further aspects of a calibration process. In a calibration process a first image plane 502, a second image plane 504, and a third image plane 506, such as for a center channel and two side channels of a single lens, three-channel imaging system, or three independent cameras, may acquire disparity information during a lookup table sweep of a calibration target 508, which may be, for example, any of the calibration targets described herein. During a calibration process, disparity data for one or more points 510 having known camera coordinates may be captured as, for example, x and y coordinates within the processing mesh of one of the image planes (502, 504, 506) and disparity data within the other image planes. Each position of the calibration target 508 may more generally yield a field of disparity vectors (or other disparity data) that may be interpolated on a fixed processing mesh. From this data, a lookup table may be generated that locally maps disparity data to depth. In application, the lookup table can be applied to recover parameters for a calculation of calibrated coordinates based on disparity data. In various embodiments, the lookup table may be indexed by location and or value of the disparity data.

Thus, a number of applications of lookup tables are disclosed herein. In one embodiment, image data including two processing mesh coordinates and a disparity value (between data of the image set at the specified processing mesh coordinates) may be applied as indices to a lookup table that provides camera coordinates for an imaged point. Numerous variations and modifications to the foregoing are possible. In another embodiment, image data including two processing mesh coordinates and a disparity value may be applied as indices to a lookup table that provides calibrated indices for a second lookup table. The location data may include, for example, a distance from a camera, one or more world coordinates, or one or more camera coordinates for an imaged point. In another aspect, there is disclosed herein a real-time, three-dimensional image capture system that achieves improved accuracy through the use of parameterized lookup tables.

It will be appreciated that the above process may be realized in hardware, software, or any combination of these suitable for the three-dimensional imaging techniques described herein. The process may be realized in one or more microprocessors, microcontrollers, embedded microcontrollers, programmable digital signal processors or other programmable device, along with internal and/or external memory. The process may also, or instead, include an application specific integrated circuit, a programmable gate array, programmable array logic, or any other device that may be configured to process electronic signals. It will further be appreciated that the process may be realized as computer executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. At the same time, processing may be distributed across the camera and/or computer in a number of ways, or all of the functionality may be integrated into a dedicated, standalone image capture device. All such permutations and combinations are intended to fall within the scope of the present disclosure.

While the invention has been disclosed in connection with certain preferred embodiments, other embodiments will be recognized by those of ordinary skill in the art, and all such variations, modifications, and substitutions are intended to fall within the scope of this disclosure. Thus, the inventions disclosed herein are to be understood in the broadest sense allowable by law.

What is claimed is:

1. A method for refining calibration of an imaging system comprising:
    acquiring image data with the imaging system from a measurement volume that includes a three-dimensional object having one or more known parameters;
    identifying a first projection contour of the three-dimensional object in the image data;
    analytically determining a second projection contour of the three-dimensional object using the one or more known parameters and a model of the imaging system;
    refining a calibration of the imaging system by minimizing a deviation between the first projection contour and the second projection contour; and
    storing the calibration in the imaging system for use in recovering calibrated coordinates during a three-dimensional scan.

2. The method of claim 1 wherein the three-dimensional object is a sphere and the one or more known parameters includes a radius of the sphere.

* * * * *

UNITED STATES PATENT AND TRADEMARK OFFICE
CERTIFICATE OF CORRECTION

PATENT NO. : 7,742,635 B2  Page 1 of 1
APPLICATION NO. : 11/534570
DATED : June 22, 2010
INVENTOR(S) : Janos Rohaly It is certified that error appears in the above-identified patent and that said Letters Patent is hereby corrected as shown below:

Column 7
Line 56; Delete "$d_y$ ($d_y$, ($d_x$," and insert -- $d_y$ ($d_x$, --, therefor.

Signed and Sealed this

Twelfth Day of October, 2010

David J. Kappos
*Director of the United States Patent and Trademark Office*